Patented Aug. 14, 1951

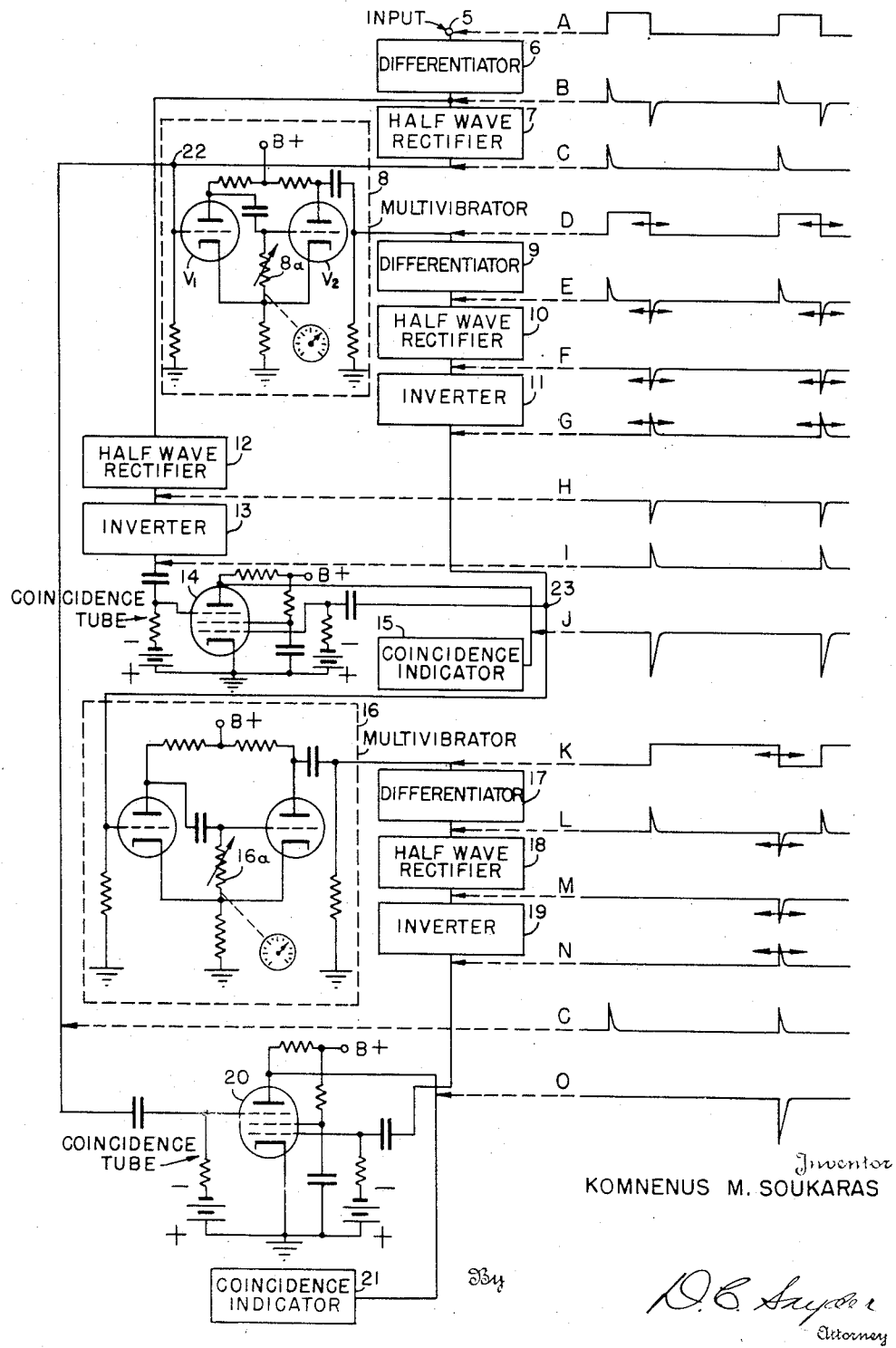

2,563,879

UNITED STATES PATENT OFFICE 2,563,879

TIME CHARACTERISTIC DETERMINATION OF RECURRENT SIGNALS

Komnenus M. Soukaras, Washington, D. C.

Application July 22, 1947, Serial No. 762,779

5 Claims. (Cl. 175—381)

(Granted under the act of March 3, 1883, as amended April 30, 1928; 370 O. G. 757)

This invention relates in general to electronic indicator systems and in particular to a system for determining the time characteristics of recurrent voltage variations.

The invention is particularly applicable to measuring the time duration and repetition frequency of pulse signals and to discriminate against pulse signals having other than a chosen duration and/or pulse repetition frequency. But it will be readily understood that this particularization constitutes no limitation on the invention which may be used with any recurrent variation including pulse and sine wave signals.

Heretofore, pulse lengths and pulse repetition frequency measurement and discimination have required excessive equipment without producing the precision that is often required.

It is therefore an object of this invention to provide a precision method and means for pulse length and pulse repetition frequency measurement and discrimination requiring a minimum of apparatus.

It is another object of this invention to provide a method and means for measuring the time relation of recurrent voltage variations by delaying one variation until it coincides with another and measuring the delay applied to said first variation.

It is another object of this invention to provide a method and means for discriminating between recurrent voltage variations according to their time relation by delaying one of said variations and producing an output only if said delay is equivalent to the time relation between said one variation and another variation.

Other objects and advantages of the invention will be apparent from the following description and accompanying drawing.

Referring now to the drawing

The figure illustrates a schematic diagram partly in block of an exemplary embodiment of the invention wherein the action of the circuit upon a periodically recurring pulse is shown by oscillograms.

Briefly, this invention measures the time relation between recurrent voltage variations such as radar pulses by delaying one variation until it coincides with another. This delay may be controlled by turning a dial calibrated in time or frequency and the coincidence indicated by suitable means such as a light. When the proper delay has been applied the indicator lights and the time relation may be read from the calibrated dial. Similarly, the invention may be used as a discriminator to respond only to variations having the time relation selected by the dial, for this purpose the indicator may be replaced by any suitable output circuit to produce the response desired.

The invention may be better understood by reference to the figure in detail. The diagram shows an embodiment of the invention adapted to measure both pulse duration and pulse repetition frequency of a periodically recurring pulse or for measuring the time delay between the transmission of a pulse and the reception of its echo in a pulse echo system such as that emitted from a radar transmitter. Such a pulse is shown at oscillogram A and is applied to the input 5 of the system as indicated by the dotted line. Said input pulses which are herein illustrated as being positive in polarity, are applied to a differentiating circuit 6 to produce a positive pulse from each leading edge and a negative pulse from each trailing edge as illustrated in oscillogram B. The differentiated pulses are then applied in parallel to a pair of half wave rectifiers 7 and 12, or other clipping circuits known to the art, to produce in the output of one a series of positive pulses C and in the output of the other a series of negative pulses H coincident respectively with the leading and trailing edges of the incoming pulses A. The positive pulses corresponding to the leading edges of the incoming pulses typified at C are applied from rectifier 7 to a one-shot multivibrator 8 for producing in response to each triggering pulse, an output pulse of variable length. Multivibrator 8 is of conventional design possessing a stable state when tube $V_1$ is blocked and tube $V_2$ is conducting and an unstable state when the conducting condition of the tubes are reversed. The latter condition occurs responsive to an output from rectifier 7 and persists for a period of time which is controllable by variable resistor $8a$. During this state a positive pulse of controllable duration as indicated by oscillogram D is produced at the plate of tube $V_2$. Said variable pulse D is differentiated by block 9, the differentiated pulses E produced thereby consist of a positive pulse coincident with the leading edge and a negative pulse coincident with the trailing edge of said multivibrator variable output pulse D. The differentiated pulses E are rectified or clipped such as by half wave rectifier 10 to eliminate the positive pulses and retain only negative pulses, oscillogram F, whose position in time is controlled by the multivibrator variable resistor $8a$ which controls the length and hence the time position of the trailing edge of the multivibrator output pulse D. Said negative pulses are applied to an inverter 11 and the resultant positive variable time pulses G are applied to one grid of a coincidence tube 14. Said pulses G are in effect equivalent to the leading edge pulses C of the incoming pulse train delayed in time by the length of the multivibrator pulses D. The coincidence tube 14 is a multi-grid tube having both its control and suppressor grid negatively biased so that simultaneous inputs to each grid are necessary to produce an output.

The negative pulses H from rectifier 12, which are coincident with the trailing edge of the incoming pulses A, are applied to an inverter 13. The resultant positive output pulses I are applied to another grid of the coincidence tube 14. If the variable time delay pulses G coincide in time with the fixed time pulses I, an output J is produced by the coincidence tube 14. Said output J may be used to operate an indicator 15 or to control or trigger other apparatus as desired.

Thus it will be seen that if the multivibrator pulse D, responsive to the leading edge pulse C of the incoming pulse A, is of the same length as the incoming pulse A, the pulses G and I responsive respectively to the trailing edges of said pulses D and A will coincide in time and the indicator 15 will be energized. The pulse length may be read directly from a calibrated dial associated with variable resistor 8a of the multivibrator 8.

The operating procedure is therefore very simple. Variable resistance 8a is adjusted until indicator 15 shows a signal, the pulse length may then be read directly from the setting of resistor 8a. In addition to providing a very simple means of determining pulse length, this invention also provides measuring and discriminating means far more accurate than any now known. Its accuracy is limited only by the width of the differentiated pulses, and these pulses are so narrow that it will usually be found advisable to square and broaden them by additional multivibrators to facilitate tuning for coincidence. In some cases it may be desirable to add impedance matching devices such as cathode followers to preserve wave shapes and eliminate distortion.

The apparatus thus far described is adequate to measure or be controlled by the time relation between any adjacent recurrent voltage variations. Obviously, application of this apparatus is not limited to recurrent pulse signals. It is admirably suited for measuring the period and therefore the frequency of sine wave voltages, it being only necessary to couple the sine wave to input 5 through suitable means now well known to the art, such as a clipper and limiter for changing the sine wave to square wave form.

It would appear from the foregoing description that if multivibrator 8 has sufficient output pulse length range, its output pulse D could be lengthened to equal the period of the pulse repetition frequency and its indicator 15 would then indicate coincidence between its trailing edge and the leading edge of the next successive incoming pulse A. However, for multivibrator 8 to produce an output pulse of sufficient length, it would be triggered a second time before its first output pulse has ceased.

To avoid this occurrence, the apparatus designated 16 through 21 has been added to show one means whereby pulse repetition frequency, or any time relation between other than adjacent variations can be determined. In this means double triggering is avoided by producing the delayed coincident pulse in a series of measured steps none of which is of sufficient length to undergo double triggering. In the embodiment shown, one step is added since one intervening change in the incoming signal must be skipped. It will be understood that this apparatus could be cascaded to skip a greater number of intervening signal variations and that the presence of these intervening variations is not required for the operation of a cascaded system.

Referring now in detail to the apparatus 16 through 21, a second multivibrator 16, identical in construction to multivibrator 8, receives wave form G at terminal 23. G represents pulses occurring in time coincident with the trailing edge of the output pulse D from multivibrator 8. Multibrator 16 is triggered by these pulses to produce a positive output pulse K of variable length. Said output pulse may be varied in length by a variable resistor 16a similar to 8a and which may be calibrated in terms of time or frequency. The output wave form K is applied to a differentiator 17 to produce a positive pulse responsive to its leading edge and a negative pulse responsive to its trailing edge as shown in oscillogram L. The positive pulses are removed by a half wave rectifier 18 as shown in oscillogram M. The variable negative pulse coincident with the trailing edge of the multivibrator 16 output pulse K is then applied to an inverter 19 and the resultant positive variable time pulse N is applied to one grid of a second coincidence tube 20. The positive pulses C, responsive to the leading edges of the incoming pulses A, are taken from terminal 22 at the output of the rectifier 7 and applied to another grid of the second coincidence tube 20. It will then be seen, that if the output K of multivibrator 16 is of sufficient length that the positive pulse N coincident with its trailing edge coincides with a positive pulse C responsive to the leading edge of the next successive incoming pulse A, the second coincidence tube 20 will produce an output O and a second indicator 21 will be energized.

The time relation causing the indication at indicator 21 may be read from the dials of resistors 8a and 16a.

If both are calibrated in time, the pulse repetition frequency is measured by adding the two readings to determine the period. Alternately, resistor 16a can be calibrated to read directly in frequency by setting resistor 8a at a predetermined position. In an instrument designed specifically to measure pulse repetition frequency, a fixed resistor could be substituted for 8a and apparatus designated 12 through 15 eliminated.

It will be apparent to those skilled in the art that this invention is capable of wide application throughout the field of electronics. Although only limited and specific embodiments have been disclosed and described, it should be understood that the many modifications possible thereof are fully realized. Therefore, this invention is not to be limited except insofar as is necessitated by the spirit of the prior art and the scope of the appended claims.

The invention described herein may be manufactured and used by or for the Government of the United States of America for governmental purposes without the payment of any royalties thereon or therefor.

What is claimed is:

1. In an electrical circuit adapted to receive recurring voltage pulses, pulse-forming means for producing a narrow pulse in response to the leading edge of each incoming voltage pulse, first pulse generating means for generating responsive to said narrow pulse a pulse of predetermined time delay with respect to said narrow pulse, second pulse generating means for generating responsive to said predetermined time delay pulse a pulse of variable time delay with respect to said predetermined time delay pulse, a time delay control having a calibrated dial for said second pulse generating means, output means operative to produce an output only when said variable time delay pulse is in time coincidence with said narrow pulse responsive to the successive incoming pulse, and indicating means responsive to said output means whereby an output is produced only when the sum of said predetermined and variable time delay equals the period of the incoming pulse repetition frequency.

2. In an electrical circuit adapted to receive recurring voltage pulses, first differentiating means for forming a first sharp pulse coincident with the leading edge of each incoming voltage pulse, a first multivibrator operative to produce an output pulse of predetermined length in response to said first sharp pulse, second differentiating means for forming a second sharp pulse coincident with the trailing edge of said first multivibrator output and delayed in time with respect to said first sharp pulse, a second multivibrator operative to produce a variable length pulse in response to said rectified and inverted second sharp pulse, a pulse length control for said second multivibrator having a calibrated dial, third differentiating means for forming a third sharp pulse coincident with the trailing edge of said second multivibrator output and variable in time with respect to said second output pulse, a coincidence tube fed by said first sharp pulse and said inverted third sharp pulse operative to produce an output when said third sharp pulse coincides in time with the next successive first sharp pulse, and indicator means excited by said coincidence tube output whereby an output is produced only when the sum of said first and second multivibrator output pulse lengths is equivalent to the period of the incoming pulse repetition frequency.

3. In an electrical circuit adapted to receive recurring voltage pulses, pulse-forming means for producing first and second narrow pulses responsive respectively to the leading and trailing edges of each incoming voltage pulse, a first pulse generator for generating a first pulse selectably delayed in time with respect to said first narrow pulse, first output means fed by said first time delayed pulse and said second narrow pulse and operative to produce an output only when said pulses are in time coincidence, first indicating means excited by said output, a second pulse generator operating responsive to the output from said first pulse generator for generating a second pulse selectably delayed in time with respect to said second narrow pulse, second output means fed by the output of said second pulse generator and said first narrow pulse and operative to produce an output responsive to coincidence of the respective input signals applied thereto and second indicating means excited by said second output means.

4. The method of determining the frequency and time duration of a periodically recurring electrical signal comprising, generating responsive to the initiation of said signal a first voltage impulse in time coincidence therewith, generating responsive to the subsidence of said signal a second voltage impulse in time coincidence therewith, generating a third voltage impulse in response to said first voltage impulse but delayed a variable time duration thereafter, adjusting the time relation of said third impulse with respect to said second impulse to establish time coincidence therebetween, indicating the duration of said signal as a function of said adjustment, generating a fourth voltage impulse in response to said third voltage impulse but delayed a variable time duration thereafter, adjusting the time relation of said fourth impulse with respect to the next successive first impulse to establish time coincidence therebetween, and indicating the frequency of said signal as a function of the adjustments of said third and fourth impulses.

5. The method of determining the frequency of a periodically recurring electrical signal comprising, generating responsive to the initiation of said signal a first voltage impulse in time coincidence therewith, generating a second impulse in response to said first impulse but delayed a predetermined time duration thereafter, generating a third voltage impulse in response to said second voltage impulse but delayed a variable time duration thereafter, adjusting the time relation of said third impulse with respect to the next successive first impulse to establish time coincidence therebetween, and indicating the frequency of said signal as a function of said adjustment.

KOMNENUS M. SOUKARAS.

REFERENCES CITED

The following references are of record in the file of this patent:

UNITED STATES PATENTS

| Number | Name | Date |
| --- | --- | --- |
| 2,287,174 | Heising | June 23, 1942 |
| 2,402,916 | Schroeder | June 25, 1946 |
| 2,414,477 | Meacham | Jan. 21, 1947 |
| 2,418,127 | Labin | Apr. 1, 1947 |
| 2,419,219 | Johnstone | Apr. 22, 1947 |
| 2,425,066 | Labin et al. | Aug. 5, 1947 |
| 2,426,910 | Wilson | Sept. 2, 1947 |
| 2,449,819 | Purington | Sept. 21, 1948 |

FOREIGN PATENTS

| Number | Country | Date |
| --- | --- | --- |
| 528,192 | Great Britain | Oct. 24, 1940 |